(12) United States Patent
Ozawa

(10) Patent No.: US 7,111,034 B2
(45) Date of Patent: Sep. 19, 2006

(54) CARRY FOREKNOWLEDGE ADDER

(75) Inventor: Shinichi Ozawa, Nara (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 638 days.

(21) Appl. No.: 10/352,903

(22) Filed: Jan. 29, 2003

(65) Prior Publication Data

US 2003/0225810 A1   Dec. 4, 2003

(30) Foreign Application Priority Data

Jun. 4, 2002   (JP)   ............................. 2002-162600

(51) Int. Cl.
*G06F 7/508*   (2006.01)

(52) U.S. Cl. .................................... 708/711

(58) Field of Classification Search ......... 708/710–713
See application file for complete search history.

(56) References Cited

U.S. PATENT DOCUMENTS

| 4,764,886 | A | * | 8/1988 | Yano | 708/712 |
|---|---|---|---|---|---|
| 4,956,802 | A | * | 9/1990 | Priem | 708/711 |
| 5,257,218 | A | * | 10/1993 | Poon | 708/712 |
| 5,337,269 | A | * | 8/1994 | McMahan et al. | 708/711 |
| 5,375,081 | A | * | 12/1994 | Anderson | 708/712 |
| 5,581,497 | A | * | 12/1996 | Kumar | 708/711 |
| 6,205,463 | B1 | * | 3/2001 | Manglore et al. | 708/710 |
| 2003/0115237 | A1 | * | 6/2003 | Fletcher | 708/711 |

* cited by examiner

*Primary Examiner*—D. H. Malzahn
(74) *Attorney, Agent, or Firm*—Rabin & Berdo, P.C.

(57) ABSTRACT

A carry foreknowledge adder comprise an adding circuit for adding binary numbers A and B of n bits; and a plurality of carry foreknowledge circuit blocks that respectively corresponding to divisional portions obtained by dividing the A and the B through setting a unit length. Each carry foreknowledge circuit block has a plurality of arithmetic operating portions (j, i) in correspondence to each bit, that respectively receive a block carry $C_{in}$ corresponding to the most significant bit in a lower the carry foreknowledge circuit block from the lower carry foreknowledge circuit block corresponding to lower divisional portion, each arithmetic operating portion arithmetically determining the carry $C_i$ on the basis of the block carry $C_{in}$, and outputting the carry $C_i$ to the adding circuit, and each arithmetic operating portion (j, i) has a logic circuit portion which receives the block carry $C_{in}$ and is arranged on an output terminal side.

11 Claims, 7 Drawing Sheets

Pi/Gi GENERATING CIRCUIT
OF EACH DIGIT
(1ST STAGE)

Pi=PROPAGATION SIGNAL
Gi=GENERATION SIGNAL
i=0,1,2, · · · · ·

CARRY FOREKNOWLEDGE ADDER

BACKGROUND OF THE INVENTION

1. Field of the Invention

The invention relates to an adder having a carry foreknowledge (carry lookahead) circuit for the purpose of raising a speed of an arithmetic operation and, more particularly, to the improvement for realization of a high speed of an arithmetic operation of a carry foreknowledge circuit.

2. Related Background Art

An adder constructed by a logic circuit is fundamentally an adder of a binary number (1 or 0) of one digit and, in the case of adding an addition number Ai (binary number of one digit) and an adding number Bi (binary number of one digit), when a carry output from one-lower digit is assumed to be a carry input Cin, an addition result Si (binary number of one digit) is shown by the following equation.

$$Si = Ai + Bi + Cin \tag{1}$$

In the equation (1) and equations which will be shown hereinbelow, "i" denotes a positive integer such as 0, 1, 2, 3, ..., shows a current digit number to be arithmetically operated upon, and indicates to which digit of a plurality of digits each of the shown numbers corresponds. A sign "+" shows a logical sum (OR) such as an OR element or the like. Cin denotes the carry output and is also expressed by a binary number of one digit.

Since the addition result Si is expressed by a binary number of one digit and (Ai+Bi+Cin) denotes the OR of three binary numbers, when the addition result Si is outputted, a carry output Ci in the case where a carry occurs is also outputted. The carry output Ci is shown by the following equation.

$$Ci = Ai \cdot Bi + (Ai + Bi) \cdot Cin \tag{2}$$

In the equation (2) and equations which will be shown hereinbelow, a sign "." denotes a logical product (AND) such as an AND element or the like.

For example, in a ripple carry adder or the like in which all adders of one digit are serially connected, the adder waits until the carry output (Cin) of a lower digit is arithmetically determined and inputted, and thereafter, arithmetic operations of the addition result Si and the carry output Ci of the upper digit are executed.

A carry foreknowledge circuit is a circuit for checking the generation of the carry output of the lower digit and grasping the carry output corresponding to it. For example, when the OR "Ai+Bi" is defined as a propagation signal Pi and the AND "Ai+Bi" is defined as a generation signal Gi, the equations (1) and (2) are shown by the following equations.

$$Si = Pi + Cin \tag{3}$$

$$Ci = Gi + Pi \cdot Cin \tag{4}$$

Since "in" of "Cin" indicates a digit which is lower by one digit than the current digit number "i" which is arithmetically operated upon, it can be also shown as "i−1".

Specific examples of the carry output are expressed by the following equations with respect to the lowest digit up to the fourth digit. A general equation is shown at the end.

$$C0 = G0 + P0 \cdot Cin$$

$$C1 = G1 + P1 \cdot C0$$

$$C2 = G2 + P2 \cdot C1$$

$$C3 = G3 + P3 \cdot C2$$

$$Cj = Gj + Pj \cdot C(j-1) \tag{5}$$

where, "j" is a positive integer such as 0, 1, 2, 3, ....

From the above examples of the carry outputs, by substituting each lower carry output into the upper carry output and developing each equation, the following equations are obtained. A general equation is shown at the end.

$$\begin{aligned}
C0 &= G0 + P0 \cdot Cin \\
C1 &= G1 + P1 \cdot (G0 + P0 \cdot Cin) \\
&= G1 + P1 \cdot G0 + P1 \cdot P0 \cdot Cin \\
C2 &= G2 + P2 \cdot (G1 + P1 \cdot C0) \\
&= G2 + P2 \cdot G1 + P2 \cdot P1 \cdot C0 \\
&= G2 + P2 \cdot G1 + P2 \cdot P1 \cdot (G0 + P0 \cdot Cin) \\
&= G2 + P2 \cdot G1 + P2 \cdot P1 \cdot G0 + P2 \cdot P1 \cdot P0 \cdot Cin \\
C3 &= G3 + P3 \cdot (G2 + P2 \cdot C1) \\
&= G3 + P3 \cdot G2 + P3 \cdot P2 \cdot C1 \\
&= G3 + P3 \cdot G2 + P3 \cdot P2 \cdot (G1 + P1 \cdot (G0 + P0 \cdot Cin)) \\
&= G3 + P3 \cdot G2 + P3 \cdot P2 \cdot G1 + P3 \cdot P2 \cdot P1 \cdot (G0 + P0 \cdot Cin) \\
&= G3 + P3 \cdot G2 + P3 \cdot P2 \cdot G1 + \\
&\quad P3 \cdot P2 \cdot P1 \cdot G0 + P3 \cdot P2 \cdot P1 \cdot P0 \cdot Cin
\end{aligned}$$

$$\begin{aligned}
Cj &= Gj + Pj \cdot G(j-1) + Pj \cdot P(j-1) \cdot G(j-2) + \\
&\quad Pj \ldots P3 \cdot P2 \cdot P1 \cdot G0 + Pj \ldots P3 \cdot P2 \cdot P1 \cdot P0 \cdot Cin
\end{aligned}$$

A circuit to realize the equations (6) is called a carry foreknowledge circuit of j [bit]. According to a carry foreknowledge adder having the carry foreknowledge circuit, by directly executing carry calculations of the upper digits from all inputs of the lower digits, they can be arithmetically calculated in parallel by adding circuits of the respective digits. Unlike a ripple carry adder or the like, since it is unnecessary to wait until the carry output of the one-lower digit (previous digit) is inputted even in the case where the digit number is large, an arithmetic operating speed can be raised.

However, the carry foreknowledge circuit has a problem such that the larger the number of digits is, the larger a circuit scale of the carry foreknowledge circuit becomes at a rate near the square of the digit number. Therefore, in the carry foreknowledge adder, for example, a plurality of carry foreknowledge circuits of about 4 bits (4 digits) are used, a numerical value larger than 4 bits is divided into groups (addition digit groups) every 4 bits (fixed length), and the addition is executed for every group in parallel.

The carry foreknowledge adder preliminarily arithmetically operates in the case where the carry input Cin from the lower group is equal to 0 and in the case where it is equal to 1 in every group and selects one of them on the basis of the carry input Cin from the group of the lower digits. That is, only the selection from two kinds of arithmetic operation results in the group of the upper digits is sequentially made by the carry output from the group of the lowest digits. Since the arithmetic operation is not started by the carry input Cin from the group of the lower digits, total arithmetic operating time is reduced.

FIG. 5 is a block diagram showing an example of a construction of an 8-bit adder using the carry foreknowledge adding circuits of 4 bits.

The left half of FIG. 5 shows the carry foreknowledge adding circuit of 4 bits on the lower side and the right half shows the carry foreknowledge adding circuit of 4 bits on the upper side.

An addition number A0 and an adding number B0 for a lower 4-bit block are inputted to a Pi/Gi generating circuit. A generation signal G0 and a propagation signal P0 of the lowest digit are generated and inputted to the carry foreknowledge circuit of 4 bits for the lower 4-bit block, and a carry output C0 is arithmetically determined. The propagation signal P0 is arithmetically operated upon together with the carry input Cin from the 4-bit adding circuit of the lower digit and an addition result S0 is arithmetically determined.

An addition number A1 and an adding number B1 for a lower 4-bit block are inputted to the Pi/Gi generating circuit. A generation signal G1 and a propagation signal P1 of the second digit from the lowest digit are generated and inputted to the carry foreknowledge circuit of 4 bits, and a carry output C1 is arithmetically determined. A propagation signal P1 is arithmetically operated upon together with the carry output C0 of the lowest digit and an addition result S1 is arithmetically determined.

Similarly, a generation signal G2 and a propagation signal P2 of the third digit from the lowest digit are generated from an addition number A2 and an adding number B2. A carry output C2 is arithmetically determined in the carry foreknowledge circuit. An addition result S2 is arithmetically determined from the propagation signal P2 and the carry output C1. A generation signal G3 and a propagation signal P3 of the highest digit of the lower 4-bit block are generated from an addition number A3 and an adding number B3. In the carry foreknowledge circuit, a carry output C3 is arithmetically determined and an addition result S3 is arithmetically determined from the propagation signal P3 and the carry output C2. The carry output C3 is transmitted to the carry foreknowledge adding circuit on the upper 4-bit side.

In the carry foreknowledge adding circuit on the upper 4-bit side, the carry output C3 is used as a carry input Cin and arithmetic operations similar to those in the carry foreknowledge adding circuit on the lower 4-bit side are executed upon the addition number Ai and the adding number Bi of each digit.

FIG. 6 is a block diagram showing a construction of the Pi/Gi generating circuit of each digit in the carry foreknowledge adding circuit of 4 bits.

As shown in FIG. 6, since the propagation signal Pi is the OR, the OR "Ai+Bi"=Pi can be outputted by inputting the addition number Ai and the adding number Bi to an OR circuit. Similarly, since the generation signal Gi is the AND, the AND "Ai·Bi"=Gi can be outputted by inputting the addition number Ai and the adding number Bi to an AND circuit.

FIG. 7 is a block diagram showing an example of the 4-bit carry foreknowledge circuit in FIG. 5 together with the Pi/Gi generating circuit.

A circuit at the first stage in FIG. 7 is a circuit in which in the Pi/Gi generating circuits shown in FIG. 6 as many as four digits are provided every digit as shown in FIG. 5. The generation signal Gi and the propagation signal Pi of each digit are generated by the circuit at the first stage.

Subsequently, in the first digit (in the case for lower 4 bits; the fifth digit in the case for upper 4 bits) in FIG. 7, the addition number A0 and the adding number B0 of the lowest digit are inputted and the generation signal G0 and the propagation signal P0 are generated by the circuit of the first stage. In an AND circuit AN62, the AND of the propagation signal P0 and the carry input Cin from the lower digit group is arithmetically determined and P0·Cin is outputted. In an OR circuit OR62, the OR of the generation signal G0 and P0·Cin is arithmetically determined and G0+P0·Cin is outputted.

As shown in the above equations (6), since G0+P0·Cin is equal to C0, C0=G0+P0·Cin in the above equations (6) is satisfied.

In the second digit (sixth digit in the case for upper 4 bits), the addition number A1 and the adding number B1 of the second digit from the lowest digit are inputted and the generation signal G1 and the propagation signal P1 are generated by the circuit of the first stage. In an AND circuit AN72, the AND of the propagation signal P0 and the carry input Cin is arithmetically determined and P0·Cin is outputted. In an AND circuit AN73, the AND of the propagation signal P1 and P0·Cin is arithmetically determined and P1·P0·Cin is outputted. In an AND circuit AN74, the AND of the propagation signal P1 and the generation signal G0 is arithmetically determined and P1·G0 is outputted. In an OR circuit OR72, P1·P0·Cin and P1·G0 are inputted and P1·G0+P1·P0·Cin is outputted. In an OR circuit OR73, P1·G0+P1·P0·Cin and the generation signal G1 are inputted and G1+P1·G0+P1·P0·Cin is outputted.

Since G1+P1·G0+P1·P0·Cin is equal to C1 as shown in the equations (6), C1=G1+P1·G0+P1·P0·Cin in the equations (6) mentioned above is satisfied.

Since an explanation is complicated with respect to the third and fourth digits, it is omitted. However, in a manner similar to the above, first, with respect to the third digit, G2+P2·G1+P2·P1·G0+P2·P1·P0·Cin is outputted from an OR circuit OR83. As described in the above equations, G2+P2·G1+P2·P1·G0+P2·P1·P0·Cin is equal to C2. Therefore, C2=G2+P2·G1+P2·P1·G0+P2·P1·P0·Cin in the equations (6) mentioned above is satisfied.

Subsequently, with respect to the fourth digit, G3+P3·G2+P3·P2·G1+P3·P2·P1·G0+P3·P2·P1·P0·Cin is outputted from an OR circuit OR95. As described in the above equations, G3+P3·G2+P3·P2·G1+P3·P2·P1·G0+P3·P2·P1·P0·Cin is equal to C3. Therefore, C3=G3+P3·G2+P3·P2·G1+P3·P2·P1·G0+P3·P2·P1·P0·Cin in the equations (6) mentioned above is satisfied.

As mentioned above, according to the conventional carry foreknowledge adder having the carry foreknowledge circuits, the arithmetic operations are executed in parallel in the adding circuits of the respective digits by directly executing the carry calculation of the upper digits by using all inputs of the lower digits, so that even if the number of digits is large, the arithmetic operating speed is raised.

However, as will be understood from FIG. 7, in the case of outputting the carry output C3 of the fourth digit, first, it is necessary that the carry input Cin from the lower digit group is inputted to an AND circuit AN92 and arithmetically operated by five circuits (5 elements) comprising the AND circuit AN92, an OR circuit OR92, an AND circuit AN98, an OR circuit OR94, and the OR circuit OR95. That is, in the conventional carry foreknowledge adder, the carry output C3 of the fourth digit is outputted only after the carry input Cin from the lower digit group was inputted and passed through the arithmetic operations of a critical path of five elements. The operation such that the carry input is arithmetically operated via the critical path of five elements results in that delay time corresponding to it is caused.

When the equations (6) are examined in detail, the carry input Cin from the lower digit group is necessary only in the last term in the equations (6). If it is shown in the case of the general equation in the equations (6), the last term is the term of the portion of "Pj . . . P3·P2·P1·P0·Cin". If it is shown in the case of the carry output C3 of the fourth digit, the last term is the term of the portion of "P3·P2·P1·P0·Cin".

As a carry foreknowledge adder, since there is a correlation between the digit number and the circuit scale as mentioned above, a plurality of circuits of about 4 bits (4 digits) are often used. Therefore, the case of the 4-bit adder will be considered hereinbelow. In this case, in the arithmetic operations to obtain the carry output C3 of the fourth digit, only the arithmetic operation of "P3·P2·P1·P0·Cin" needs the input of the carry input Cin from the lower digit group. If the circuit of the portion to execute the arithmetic operation of "P3·P2·P1·P0 Cin" can be arranged to the final stage of the carry foreknowledge adder, the arithmetic operations can be preliminarily executed with respect to the terms other than the last term in the equations (6). An amount of arithmetic operations which are executed after the input of the carry input Cin from the lower digit group can be reduced. Thus, the arithmetic operating speed can be raised.

However, hitherto, a circuit for further arithmetically determining the AND of the carry input Cin from the lower digit group and the AND arithmetic operation result of the propagation signals Pi of all digits such as "P3 P2 P1·P0" and the like at the final stage of an arbitrary digit of the carry foreknowledge circuit is not known.

SUMMARY OF THE INVENTION

The invention is made to solve the conventional problems as mentioned above and it is an object of the invention to provide a carry foreknowledge adder in which a carry input Cin from a lower digit group is inputted to a final stage of the carry foreknowledge adder, an amount of arithmetic operations which are executed after the input of the carry input Cin is reduced, and an arithmetic operating speed is further raised.

To accomplish the above objet, the following constructions are used.

<Construction 1>

According to the invention, there is provided a carry foreknowledge adder comprising: an adding circuit which adds binary numbers A and B of n bits; and a plurality of carry foreknowledge circuit blocks (j (j=0, 1, . . . , k−1)) that respectively corresponding to divisional portions $A_{k-1}$, $A_{k-2}$, . . . , $A_0$ and $B_{k-1}$, $B_{k-2}$, . . . , $B_0$ obtained by dividing the A and the B into integer k (k≧2) portions through setting m bits (2≦m<n) into a unit length, the carry foreknowledge circuit block preliminarily arithmetically determining each carry $C_i$ (i=0, 1, . . . , m−1) corresponding to each of bit $A_i$ and bit $B_i$ and outputting them to the adding circuit, wherein the carry foreknowledge circuit block (j) has a plurality of arithmetic operating portions (j, i) in correspondence to each bit, that respectively receive a carry $C_{m-1}$, as a block carry $C_{in}$, corresponding to the most significant bit in a lower the carry foreknowledge circuit block (j, i) from the lower carry foreknowledge circuit block (j−1) corresponding to lower the divisional portion, each arithmetic operating portion arithmetically determining the carry $C_i$ on the basis of the block carry $C_{in}$ and outputting the carry $C_i$ to the adding circuit, and the arithmetic operating portion (j, i) has a logic circuit portion which receives the block carry $C_{in}$ and is arranged on an output terminal side.

In the carry foreknowledge adder according to the invention, the carry foreknowledge circuit block (j) further receives an H signal indicative of the high level and an L signal indicative of the low level, on the basis of each highest logic circuit portion provided for the highest arithmetic operating portion (j, m−1) corresponding to the most significant bit in the carry foreknowledge circuit block (j), other the arithmetic operating portions (j, i (i<m−1)) have the logic circuit portions in correspondence to each of the highest logic circuit portions, and the logic circuit portions includes a logic circuit portion which receives the H signal and a logic circuit portion which receives the L signal.

Also, the carry foreknowledge adder according to the invention, further comprise a plurality of generating circuits (j (j=0, 1, . . . , k−1)) respectively corresponding to each of the divisional portions $A_{m-1}$, $A_{m-2}$, . . . , $A_0$ and $B_{m-1}$, $B_{m-2}$, . . . , $B_0$, each the generating circuit generating a plurality of logic OR $P_i$ (i=0, 1, . . . , m−1) values and logic AND $G_i$ values corresponding to the bit $A_i$ and the bit $B_i$, and each arithmetic operating portion (j, i) may receive the $P_i$ and the $G_i$ and execute an arithmetic determination of the carry $C_i$ by using the $P_i$, the $G_i$ and the block carry $C_{in}$, and on the basis of the following logic arithmetic operational equation:

$$C_i = G_i + P_i \cdot G_{i-1} + P_i \cdot P_{i-1} \cdot G_{i-2} + \ldots + P_i \cdot P_{i-1} \ldots P_3 \cdot P_2 \cdot P_1 \cdot G_0 + P_i \cdot P_{i-1} \ldots P_2 \cdot P_1 \cdot P_0 \cdot C_{in}.$$

Further, in the carry foreknowledge adder according to the invention, the carry foreknowledge circuit block (j) further may receive an H signal indicative of the high level and an L signal indicative of the low level, on the basis of each highest logic circuit portion provided for the highest arithmetic operating portion (j, m−1) corresponding to the most significant bit in the carry foreknowledge circuit block (j), other the arithmetic operating portions (j, i (i<m−1)) have the logic circuit portions in correspondence to each of the highest logic circuit portions, and the logic circuit portions includes a logic circuit portion which receives the H signal and a logic circuit portion which receives the L signal.

Moreover, each of the unit lengths may be set to be constant or inconstant.

Also, in the carry foreknowledge adder, the n may be equal to a multiple of 4, the unit length may be equal to 4 bits, and the carry foreknowledge circuit block may be a carry foreknowledge circuit block of 4 bits.

<Construction 2>

According to the invention, there is provided a carry foreknowledge adder comprising:

an adding circuit which adds binary numbers A and B of n bits; and a plurality of carry foreknowledge circuit blocks (j (j=0, 1, . . . , k−1)) that respectively corresponding to divisional portions $A_{m-1}$, $A_{m-2}$, . . . , $A_0$ and $B_{m-1}$, $B_{m-2}$, . . . , $B_0$ obtained by dividing the A and the B into integer k (k≧2) portions through setting m bits (2≦m<n) into a unit length, the carry v circuit block preliminarily arithmetically determining each carry $C_i$ (i=0, 1, . . . , m−1) corresponding to each of bit $A_i$ and bit $B_i$ and outputting them to the adding circuit, wherein the carry foreknowledge circuit block (j) has a plurality of arithmetic operating portions (j, i) in correspondence to each bit, that respectively arithmetically determine the carry $C_i$ and output the carry $C_i$ to the adding circuit;

each upper the arithmetic operating portion (j, i) respectively corresponding to each of the bits of at least two digits from the most significant bit, in order to execute the arithmetical operation, has a logic circuit portion which receives a lower output signal outputted from a logic circuit portion arranged on an output terminal side of a lower the arithmetic operating portion (j, i) corresponding to the lower bit following under the at least two digits, and which is arranged on the output terminal side, and executes the arithmetic determination of the carry $C_i$ by using the received lower output signal.

In the adder, the carry foreknowledge circuit block (j) further receives an H signal indicative of the high level and an L signal indicative of the low level, on the basis of each highest logic circuit portion provided for the highest arithmetic operating portion (j, m−1) corresponding to the most significant bit in the carry foreknowledge circuit block (j), other the arithmetic operating portions (j, i (i<m−1)) have the logic circuit portions in correspondence to each of the highest logic circuit portions, and the logic circuit portions includes a logic circuit portion which receives the H signal and a logic circuit portion which receives the L signal.

Also, the adder further may comprise a plurality of generating circuits (j (j=0, 1, . . . , k)) respectively corresponding to each of the divisional portions $A_{m-1}$, $A_{m-2}$, . . . , $A_0$ and $B_{m-1}$, $B_{m-2}$, . . . , $B_0$, each the generating circuit generating a plurality of logic OR $P_i$ values and logic AND $G_i$ values in correspondence with the bit $A_i$ (i=0, 1, . . . , m−1) and the bit $B_i$, and each of the arithmetic operating portions receives the corresponding $P_i$ and $G_i$ and executes the arithmetic determination of the carry $C_i$ on the basis of the $P_i$ and the $G_i$.

Further, in the adder, the n is equal to a multiple of 4, the unit length is equal to 4 bits, and the carry foreknowledge circuit block is a carry foreknowledge circuit block of 4 bits, the lowest arithmetic operating portion (j, 0) for the carry $C_0$ corresponding to the least significant bit locating in the first digit receives the carry $C_{m-1}$, as a block carry $C_{in}$, corresponding to the most significant bit in a lower carry foreknowledge circuit block (j−1) from the lower carry foreknowledge circuit block (j−1) corresponding to the lower divisional portion and arithmetically determines the carry $C_0$ in accordance with the following logic arithmetic operational equation $$C_0 = G_0 + P_0 \cdot C_{in}$$

by using the block carry $C_{in}$ and the inputted $P_0$ and $G_0$, the arithmetic operating portion (j, 1) corresponding to the bit locating in the second digit arithmetically determines the carry $C_1$ in accordance with the following logic arithmetic operational equation $$C_1 = G_1 + P_1 \cdot C_0,$$

the arithmetic operating portion (j, 2) corresponding to the bit locating in the third digit arithmetically determines the carry $C_2$ in accordance with the following logic arithmetic operational equation $$C_2 = (G_2 + P_2 \cdot G_1) + P_2 (P_1 \cdot C_0),$$

the arithmetic operating portion (j, 3) corresponding to the most significant bit locating in the fourth digit arithmetically operates the carry $C_3$ in accordance with the following logic arithmetic operational equation $$C_3 = (G_3 + P_3 \cdot G_2) + P_3 \cdot P_2 \cdot G_1 + P_3 \cdot P_2 \cdot (P_1 \cdot C_0), \text{ and}$$

the lower output signal is $P_1 \cdot C_0$.

Moreover, in the adder, each of the unit lengths may be set to be constant or inconstant.

The above and other objects and features of the present invention will become apparent from the following detailed description and the appended claims with reference to the accompanying drawings.

DETAILED DESCRIPTION OF THE PREFERRED EMBODIMENTS

The present invention will now be described hereinbelow on the basis of embodiments shown in the diagrams.

Embodiment 1

Figure 1:
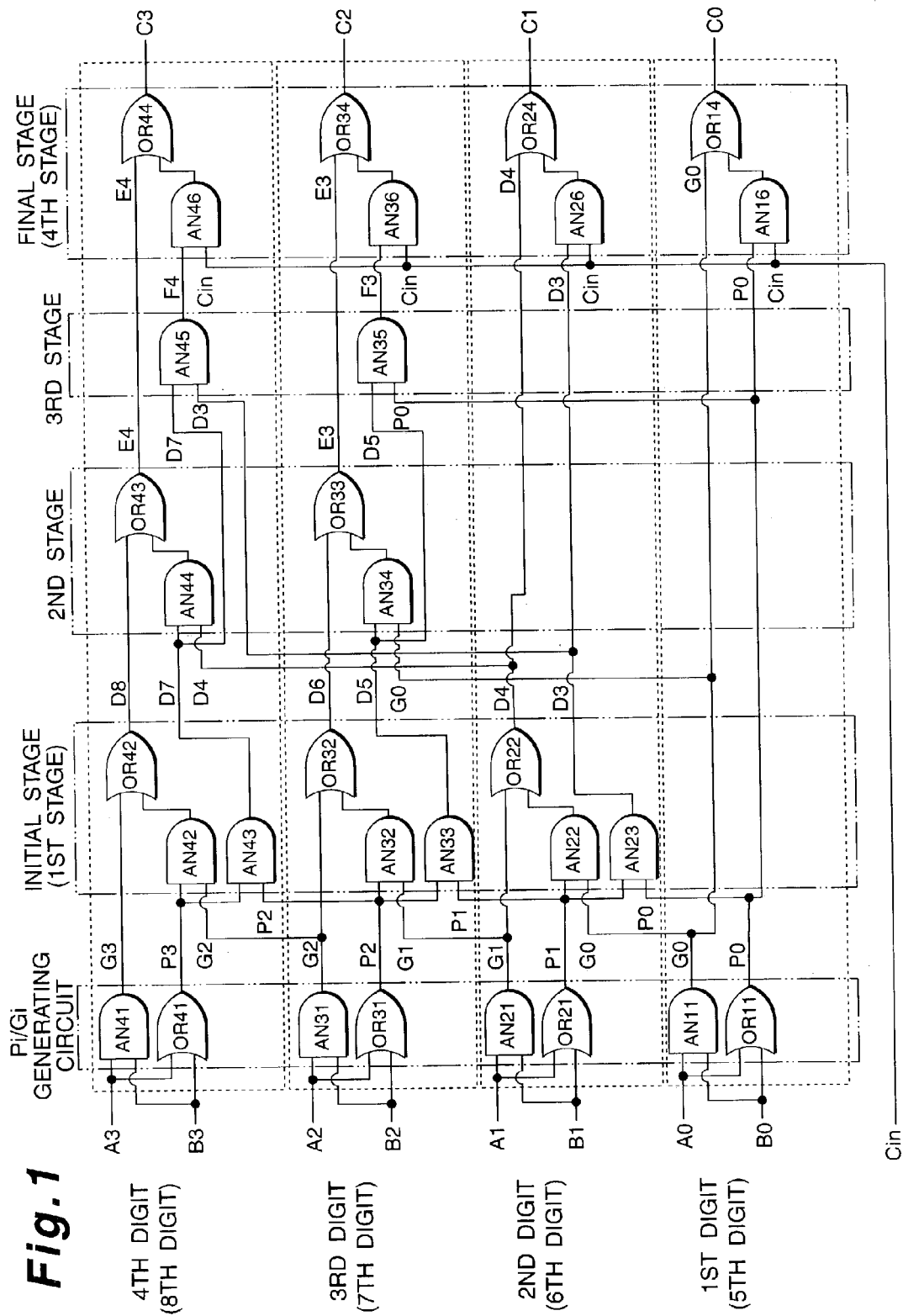
FIG. 1 is a block diagram showing a main portion of a carry foreknowledge adder according to the embodiment 1 of the invention.

FIG. 1 is a block diagram showing a main portion of a carry foreknowledge adder according to the embodiment 1 of the invention.

Figure 7:
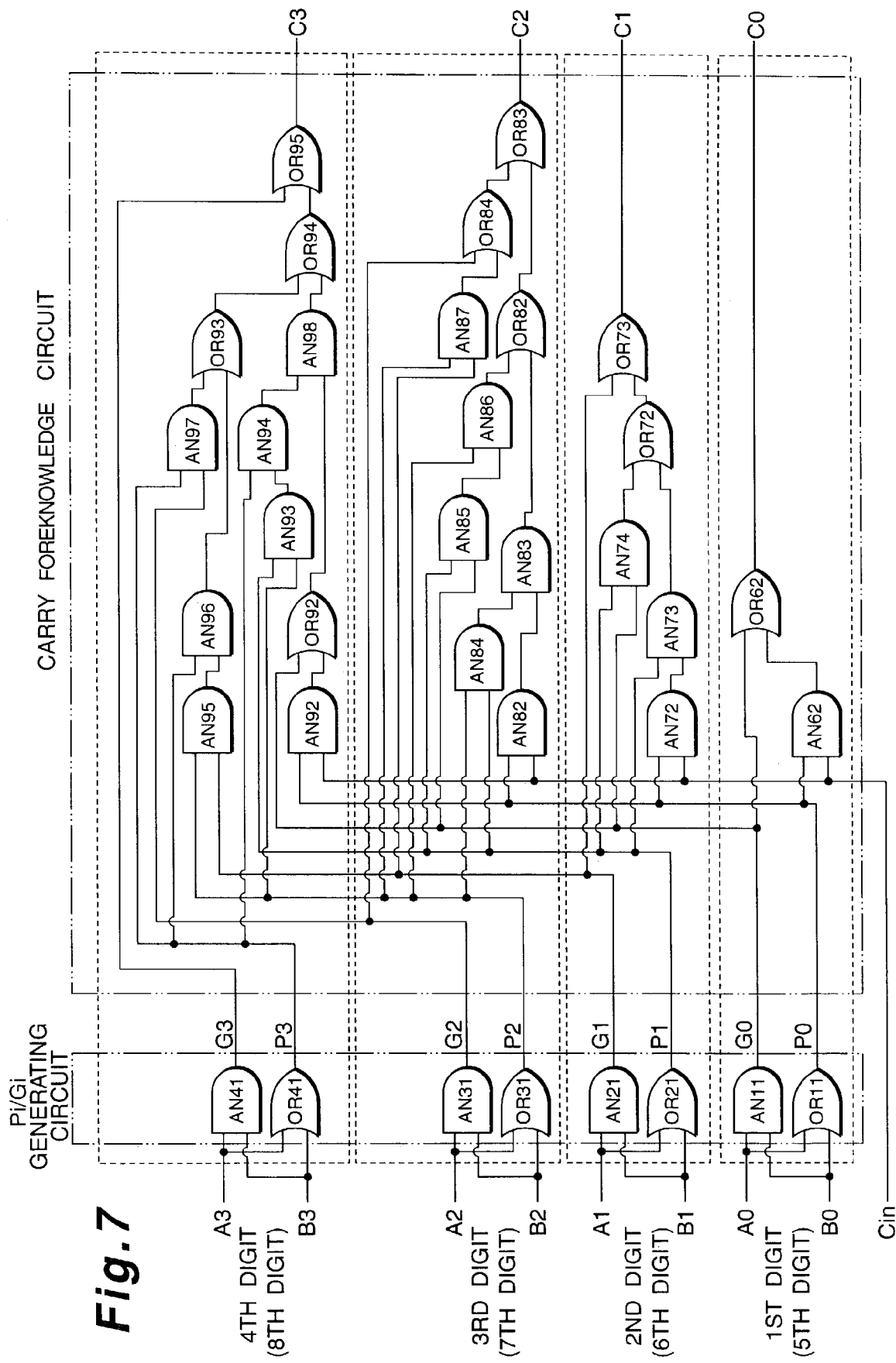
FIG. 7 is a block diagram showing an example of the carry foreknowledge circuit of 4 bits in FIG. 5 together with the Pi/Gi generating circuit.

In FIG. 1, portions having substantially the same functions as those in the conventional carry v adder shown in FIG. 7 are designated by the same reference numerals or characters and their overlapped explanations are omitted.

Generally, the carry foreknowledge adder has a carry foreknowledge circuit (carry foreknowledge circuit block) constructed in a manner such that each of an addition number A and an adding number B (for example, n bits) is divided every addition digit group of a fixed length (for example, m bits), a case where the carry input Cin from the lower addition digit group (divisional portion) is equal to 0 and a case where it is equal to 1 are preliminarily arithmetically determined in parallel every addition digit group, and one of them is selected in response to the carry input Cin from the addition digit group of the lower digit. The carry foreknowledge circuit receives the propagation signal Pi as an OR of the addition number Ai and the adding number Bi of each digit, the generation signal Gi as an AND of the addition number Ai and the adding number Bi of each digit, and the carry output Cin from the one-lower addition digit group and arithmetically determines the carry output of at least the maximum digit.

The embodiment shown in FIG. 1 differs from the conventional example shown in FIG. 7 with respect to points shown in the following features.

(Feature 1)

In the carry foreknowledge circuit in the embodiment, an arithmetic operating portion for arithmetically determining the carry Ci and outputting it to the adding circuit in correspondence to each bit has a final stage circuit. The final stage circuit (fourth stage in FIG. 1) of an arbitrary digit has circuits (AND circuits AN16, AN26, AN36, and AN46 in FIG. 1) each for arithmetically determining the AND of the input of the carry output Cin from the addition digit group of the lower digit and the arithmetic operation result of the AND of the propagation signal Pi of all digits which are inputted to the carry foreknowledge circuit.

The operation of each circuit (element) will be specifically explained with reference to FIG. 1. The carry output Cin and the propagation signal P0 are inputted to the AND circuit AN16 of the first digit at the final stage (fourth stage) and P0·Cin is outputted. The carry output Cin and D3=P0·P1 are inputted to the AND circuit AN26 of the second digit and P1·P0·Cin is outputted.

The carry output Cin and F3=P2·P1·P0 are inputted to the AND circuit AN36 of the third digit and P2·P1·P0·Cin is outputted. The carry output Cin and F4=P3·P2·P1 P0 are inputted to the AND circuit AN46 of the fourth digit and P3·P2·P1·P0·Cin is outputted.

(Feature 2)

In the carry foreknowledge circuit in the embodiment, the final stage circuit (fourth stage in FIG. 1) of an arbitrary digit has circuits (OR circuits OR14, OR24, OR34, and OR44 in FIG. 1) each for arithmetically determining the OR of the result of the arithmetic operation obtained in the case where the carry input Cin from the addition digit group of the lower digit is not used and the AND obtained in the case where the carry input Cin from the addition digit group of the lower digit is used.

The operation of each circuit (element) will be specifically explained with reference to FIG. 1. P0·Cin from the AND circuit AN16 and the generation signal G0 of the first digit are inputted to the OR circuit OR14 of the first digit at the final stage (fourth stage) and G0+P0·Cin is outputted as a carry output C0 of the first digit.

P1·P0·Cin from the AND circuit AN26 and the OR of the generation signal G1 of the second digit and P1·G0 are inputted to the OR circuit OR24 of the second digit and G1+P1·G0+P1·P0·Cin is outputted as a carry output C1 of the second digit.

P2·P1·P0·Cin from the AND circuit AN36 and the OR of the generation signal G2 of the third digit, P2·G1, and P2·P1·G0 are inputted to the OR circuit OR34 of the third digit and G2+P2·G1+P2·P1·G0+P2·P1·P0·Cin is outputted as a carry output C2 of the third digit.

P3·P2·P1·P0 Cin from the AND circuit AN46 and the OR of the generation signal G3 of the fourth digit, P3·G2, P3·P2·G1, and P3·P2·P1·G0 are inputted to the OR circuit OR44 of the fourth digit and G3+P3·G2+P3·P2·G1+P3·P2·P1·G0+P3·P2·P1·P0·Cin is outputted as a carry output C3 of the fourth digit.

Since the foregoing carry outputs C0 to C3 have the contents shown in the equations (6) in a manner similar to the conventional carry foreknowledge adder shown in FIG. 7, it will be understood that the embodiment has no problem as a logic circuit.

(Feature 3)

In the carry foreknowledge circuit in the embodiment, the initial stage circuit (first stage in FIG. 1) of an arbitrary digit in a range from at least the maximum digit to the second smallest digit (second digit (or sixth digit) in FIG. 1; hereinbelow, only the second digit is disclosed) from the minimum digit has circuits (AND circuits AN23, AN33, and AN43 in FIG. 1) each for arithmetically determining the AND of the propagation signal Pi of such an arbitrary digit and the propagation signal P(i−1) of the digit which is lower than the arbitrary digit by one.

The operation of each circuit (element) will be specifically explained with reference to FIG. 1. The propagation signal P0 from an OR circuit OR11 of the first digit and the propagation signal P1 from an OR circuit OR21 of the second digit are inputted to the AND circuit AN23 at the initial stage (first stage) of the second digit and P1·P0 is outputted as an output signal D3 at the initial stage of the second digit.

Similarly, the propagation signal P1 from the OR circuit OR21 of the second digit and the propagation signal P2 from an OR circuit OR31 of the third digit are inputted to the AND circuit AN33 in the initial stage (first stage) of the third digit and P2·P1 is outputted as an output signal D5 at the initial stage of the third digit. The propagation signal P2 from the OR circuit OR31 of the third digit and the propagation signal P3 from an OR circuit OR41 of the fourth digit are inputted to the AND circuit AN43 in the initial stage (first stage) of the fourth digit and P3·P2 is outputted as an output signal D7 at the initial stage of the fourth digit.

(Feature 4)

In the carry foreknowledge circuit in the embodiment, the front stage circuit (third stage in FIG. 1) of the final stage of an arbitrary digit in a range from at least the maximum digit to the third smallest digit (third digit (or seventh digit) in FIG. 1; hereinbelow, only the third digit is disclosed) from the minimum digit has circuits (AND circuits AN35 and AN45 in FIG. 1) each for arithmetically determining the AND of the arithmetic operation result (D3, D5, and D7 in FIG. 1) of the AND of the propagation signal Pi of the arbitrary digit and the propagation signal P(i−1) of the digit which is lower than the arbitrary digit by one as described in the above feature 3; and the arithmetic operation result (D3, D5, and D7 in FIG. 1) of the AND of the arithmetic operation result (P0, P1, P2, and P3 in FIG. 1) of another digit or the propagation signals Pi of a plurality of digits.

The operation of each circuit (element) will be specifically explained with reference to FIG. 1. The propagation signal P0 from the OR circuit OR11 at the initial stage of the first digit and the output signal D5 (=P2·P1) from the AND circuit AN33 at the initial stage of the third digit are inputted to the AND circuit AN35 in the third stage of the third digit and P2·P1·P0 is outputted as an output signal F3 at the third stage of the third digit.

Similarly, the output signal D3 (=P1·P0) from the AND circuit AN23 at the initial stage of the first digit and an output signal D7 (=P3·P2) from the AND circuit AN43 at the initial stage of the fourth digit are inputted to the AND circuit AN45 in the third stage of the fourth digit and P3·P2·P1 P0 is outputted as an output signal F4 at the third stage of the fourth digit.

(Feature 5)

In the carry foreknowledge circuit in the embodiment, the initial stage circuit (first stage in FIG. 1) of an arbitrary digit in a range from at least the maximum digit to the second smallest digit (second digit in FIG. 1) from the minimum digit has circuits (AND circuits AN22, AN32, and AN42 in FIG. 1) each for arithmetically determining the AND of the propagation signal Pi of the arbitrary digit and the generation signal G(i−1) of the digit which is lower than the arbitrary digit by one.

The operation of each circuit (element) will be specifically explained with reference to FIG. 1. The generation signal G0 from an AND circuit AN11 of the first digit and the propagation signal P1 from the OR circuit OR21 of the second digit are inputted to the AND circuit AN22 in the initial stage (first stage) of the second digit and P1·G0 is outputted to an OR circuit OR22 in the initial stage (first stage) of the second digit.

Similarly, the generation signal G1 from an AND circuit AN21 of the second digit and the propagation signal P2 from the OR circuit OR31 of the third digit are inputted to the AND circuit AN32 in the initial stage (first stage) of the third digit and P2·G1 is outputted to an OR circuit OR32 in the initial stage of the third digit. The generation signal G2 from an AND circuit AN31 of the third digit and the propagation signal P3 from the OR circuit OR41 of the fourth digit are inputted to the AND circuit AN42 in the initial stage (first stage) of the fourth digit and P3·G2 is outputted to an OR circuit OR42 in the initial stage of the fourth digit.

(Feature 6)

In the carry foreknowledge circuit in the embodiment, the initial stage circuit (first stage in FIG. 1) of an arbitrary digit in a range from at least the maximum digit to the second smallest digit (second digit in FIG. 1) from the minimum digit has circuits (OR circuits OR22, OR32, and OR42 in FIG. 1) each for arithmetically determining the OR of the generation signal Gi of the arbitrary digit and the AND calculated by using the propagation signal Pi of the arbitrary digit, and the generation signal G(i−1) of the digit which is lower than the arbitrary digit by one.

The operation of each circuit (element) will be specifically explained with reference to FIG. 1. The output P1·G0 from the AND circuit AN22 of the second digit described in the feature 5 mentioned above and the generation signal G1 of the second digit are inputted to the OR circuit OR22 in the initial stage (first stage) of the second digit and G1+P1·G0 is outputted as an output signal D4 at the initial stage of the second digit.

Similarly, the output P2·G1 from the AND circuit AN32 of the third digit described in the feature 5 mentioned above and the generation signal G2 from the AND circuit AN31 of the third digit are inputted to the OR circuit OR32 in the initial stage (first stage) of the third digit and G2+P2·G1 is outputted as an output signal D6 at the initial stage of the third digit. The output P3·G2 from the AND circuit AN42 of the fourth digit described in the feature 5 mentioned above and the generation signal G3 from the AND circuit AN41 of the fourth digit are inputted to the OR circuit OR42 in the initial stage (first stage) of the fourth digit and G3+P3·G2 is outputted as an output signal D8 at the initial stage of the fourth digit.

(Feature 7)

In the carry foreknowledge circuit in the embodiment, the second stage circuit of an arbitrary digit in a range from at least the maximum digit to the third smallest digit (third digit in FIG. 1) from the minimum digit has circuits (AND circuits AN34 and AN44 in FIG. 1) each for arithmetically determining the AND of the arithmetic operation result of the AND of the propagation signal Pi of such an arbitrary digit outputted from the initial stage (first stage in FIG. 1) and the propagation signal P(i−1) of the digit which is lower than the arbitrary digit by one; and the arithmetic operation result of the OR of the arithmetic operation result of the AND of the propagation signal P(i−2) of the digit which is lower than the arbitrary digit by two and the generation signal G(i−3) of the digit which is lower than the arbitrary digit by three and the generation signal G(i−2) of the digit which is lower than the arbitrary digit by two.

The operation of each circuit (element) will be specifically explained with reference to FIG. 1. The generation signal G0 from the AND circuit AN11 of the first digit and the output signal D5 (=P2·P1) from the AND circuit AN33 at the initial stage of the third digit are inputted to the AND circuit AN34 in the second stage of the third digit and P2·P1·G0 is outputted to an OR circuit OR33 in the second stage of the third digit. The arithmetic operation result (=0) of the AND of the propagation signal P0 of the 2-lower digit (first digit) of the third digit and the generation signal G(i−3) (=there is no corresponding signal) of the 3-lower digit of the third digit and the arithmetic operation result (=G0) of the OR with the generation signal G0 of the 2-lower digit (first digit) of the third digit become eventually only the generation signal G0 because the generation signal G(i−3) is (there is no corresponding signal).

Similarly, the output signal D4 (=G1+P1·G0) from the OR circuit OR22 at the initial stage of the second digit and the output signal D7 (=P3·P2) from the AND circuit AN43 at the initial stage of the fourth digit are inputted to the AND circuit AN44 in the second stage of the fourth digit and P3·P2(G1+P1·G0) is outputted to an OR circuit OR43 at the second stage of the fourth digit.

(Feature 8)

In the carry foreknowledge circuit in the embodiment, the second stage circuit of an arbitrary digit in a range from at least the maximum digit to the third smallest digit from the minimum digit has a circuit for arithmetically determining the OR of the arithmetic operation result of the AND of the arithmetic operation result of the AND of the propagation signal Pi of such an arbitrary digit, the propagation signal P(i−1) of the digit which is lower than the arbitrary digit by one, the propagation signal P(i−2) of the digit which is lower than the arbitrary digit by two, and the generation signal G(i−3) of the digit which is lower than the arbitrary digit by three and the arithmetic operation result of the OR with the generation signal G(i−2) of the digit which is lower than the arbitrary digit by two; and the arithmetic operation result of the OR of the arithmetic operation result of the AND obtained by using the propagation signal Pi of the arbitrary digit and the generation signal G(i−1) of the digit which is lower than the arbitrary digit by one and the generation signal Gi of the arbitrary digit.

The operation of each circuit (element) will be specifically explained with reference to FIG. 1. As an output from the AND circuit AN34 of the third digit described in the feature 7 mentioned above, the output signal D5·G0 (=P2·P1·G0) and the output signal D6 (=G2+P2·G1) at the initial stage of the third digit are inputted to the OR circuit OR33 in the second stage of the third digit and G2+P2·G1+P2·P1·G0 is outputted as an output signal E3.

Since there is no 3-lower digit of the third digit, the arithmetic operation result of the AND of the propagation signal P2, the propagation signal P1 of the second digit which is lower than the third digit by one, the propagation signal P0 of the first digit which is lower than the third digit by two, and the generation signal G of the digit which is lower than the third digit by three is equal to 0, and the arithmetic operation result of the OR of them is also only the generation signal G0. The OR of the arithmetic operation result (=P2·G1) of the AND calculated by using the propagation signal P2 of the third digit and the generation signal G1 of the 1-lower second digit of the third digit and the generation signal G2 of the third digit is equal to G2+P2·G1.

As an output from the AND circuit AN44 of the fourth digit described in the feature 7 mentioned above, the output signal D7·D4 (=P3·P2(G1+P1·G0)) and the output signal D8 (=G3+P3·G2) at the initial stage of the third digit are inputted to the OR circuit OR43 in the second stage of the fourth digit and $G3+P3 \cdot G2+P3 \cdot P2 \cdot G1+P3 \cdot P2 \cdot P1 \cdot G0$ is outputted as an output signal E4.

The arithmetic operation result ($=P3 \cdot P2(G1+P1 \cdot G0)$) of the AND of the arithmetic operation result of the AND of the propagation signal P3 of the fourth digit and the propagation signal P2 of the 1-lower third digit of the fourth digit and the arithmetic operation result ($=G1+P1 \cdot P0$) of the OR of the AND of the propagation signal P1 of the 2-lower second digit of the fourth digit and the generation signal G0 of the 3-lower first digit of the fourth digit and the generation signal G1 of the 2-lower second digit of the fourth digit and the arithmetic operation result of the OR of the arithmetic operation result of the AND calculated by using the propagation signal P3 of the fourth digit and the generation signal G2 of the 1-lower third digit of the fourth digit and the generation signal G3 of the fourth digit are inputted and the OR is arithmetically determined. Thus, $G3+P3 \cdot G2+P3 \cdot P2 \cdot G1+P3 \cdot P2 \cdot P1 \cdot G0$ is outputted as an output signal E4.

By modifying the equations up to the fourth digit (C3) of the equations (6) in the circuit of the embodiment as will be explained hereinbelow, the following circuit constructions are obtained.

$$C0=G0+P0 \cdot Cin$$

$$C1=G1+P1 \cdot G0+P1 \cdot P0 \cdot Cin$$

$$C2=(G2+P2 \cdot G1)+P2 \cdot P1 \cdot G0+P2 \cdot P1 \cdot P0 \cdot Cin$$

$$C3=(G3+P3 \cdot G2)+P3 \cdot P2(G1+P1 \cdot G0)+ P3 \cdot P2 \cdot P1 \cdot P0 \cdot Cin \quad (7)$$

In the equations (7), $G0+P0 \cdot Cin$ in the equation of the carry output C0 of the first digit is formed by the AND circuit AN16 and the OR circuit OR14 at the final stage of the first digit.

$G1+P1 \cdot G0$ in the equation of the carry output C1 of the second digit is formed by the AND circuit AN22 and the OR circuit OR22 at the initial stage of the second digit.

$P1 \cdot P0 \cdot Cin$ in the equation of the carry output C1 of the second digit is formed by the AND circuit AN26 and the OR circuit OR24 at the final stage of the second digit. $G2+P2 \cdot G1$ in the equation of the carry output C2 of the third digit is formed by the AND circuit AN32 and the OR circuit OR32 at the initial stage of the third digit.

$P2 \cdot P1 \cdot G0$ in the equation of the carry output C2 of the third digit is formed by the AND circuit AN34 at the second stage of the third digit.

$P2 \cdot P1 \cdot P0 \cdot Cin$ in the equation of the carry output C2 of the third digit is formed by the AND circuit AN36 at the final stage of the third digit.

$G3+P3 \cdot G2$ in the equation of the carry output C3 of the fourth digit is formed by the AND circuit AN42 and the OR circuit OR42 at the initial stage of the fourth digit.

$P3 \cdot P2(G1+P1 \cdot G0)$ in the equation of the carry output C3 of the fourth digit is formed by the AND circuit AN44 at the second stage of the fourth digit.

$P3 \cdot P2 \cdot P1 \cdot P0 \cdot Cin$ in the equation of the carry output C3 of the fourth digit is formed by the AND circuit AN46 at the final stage of the fourth digit.

From the outputs of the respective stages in FIG. 1, the carry outputs C0 to C3 of the first to fourth digits in the embodiment are obtained as follows.

$$C0 = G0 + P0 \cdot Cin \quad (8)$$

$$C1 = D4 + D3 \cdot Cin = G1 + P1 \cdot G0 + P1 \cdot P0 \cdot Cin$$

$$C2 = E3 + F3 \cdot Cin = D6 + D5 \cdot G0 + D5 \cdot P0 \cdot Cin$$
$$= G2 + P2 \cdot G1 + P2 \cdot P1 \cdot G0 + P2 \cdot P1 \cdot P0 \cdot Cin$$

$$C3 = E4 + F4 \cdot Cin = D8 + D7 \cdot D4 + D7 \cdot D3 \cdot Cin$$
$$= G3 + P3 \cdot G2 + P3 \cdot P2 \cdot G1 +$$
$$P3 \cdot P2 \cdot P1 \cdot G0 + P3 \cdot P2 \cdot P1 \cdot P0 \cdot Cin$$

Since the equations up to the fourth digit in the equations (8) are the same as those in the equations (6), a similar result can be outputted as a logic circuit.

Subsequently, the conventional carry foreknowledge circuit shown in FIG. 7 is compared with that in the embodiment shown in FIG. 1. In the embodiment, the carry input Cin from the 4-bit adding circuit of the lower digit is inputted to the final stages of all digits of the carry foreknowledge circuit and the arithmetic foreknowledge operation result of the AND of the propagation signals Pi of all digits such as "$P3 \cdot P2 \cdot P1 \cdot P0$" and the like can be obtained at timing up to the front stage of the final stage. Therefore, the AND of the arithmetic operation result of the AND of the propagation signals Pi of all digits and the carry input Cin from the 4-bit adding circuit of the lower digit can be further arithmetically determined.

As mentioned above, according to the embodiment, since the carry input Cin from the lower digit group (addition digit group) has been inputted to the final stage of the carry foreknowledge adder, an amount of arithmetic operations which are executed after the carry input Cin can be reduced, the arithmetic operation time can be further decreased, and the arithmetic operating speed can be further raised.

In the case of executing the addition of 8 bits by using the two 4-bit adders in the embodiment or in the case of executing the addition of 12 bits or more by using the three or more 4-bit adders, in each adder of every 4 bits, the arithmetic operating processes up to the one-preceding stage of the final stage can be simultaneously executed in parallel in the lower digit group and the upper digit group, so that the processing time as a whole adding process can be further reduced.

In the case of calculating the number of elements as the number of 2-input elements, 27 elements are necessary in the conventional carry foreknowledge circuit shown in FIG. 7. However, according to the embodiment, since the carry foreknowledge circuit can be constructed by 23 elements, the circuit scale can be reduced.

As a critical path in the carry foreknowledge circuit, in the conventional carry foreknowledge circuit shown in FIG. 7, the arithmetic operation needs to be executed by using five elements in order to output the carry output C3. However, according to the embodiment, since the carry output C3 can be outputted merely by executing the arithmetic operation by using four elements, the arithmetic operating time can be reduced and the operating speed can be raised.

Embodiment 2

According to the embodiment 1, only the least necessary number of elements have been used as a circuit construction of each digit and the carry foreknowledge adding circuit of 4 bits has been constructed as a construction which is unique every digit. However, in the design of the adding circuit, a change in number of arithmetic operation bits or a change in number of arithmetic operation digits frequently occurs.

Therefore, an embodiment in which by forming the construction of each digit in the embodiment 1 mentioned above in common, even if the number of arithmetic operation bits or the number of arithmetic operation digits is changed, it can be easily changed will be described hereinbelow.

Figure 2:
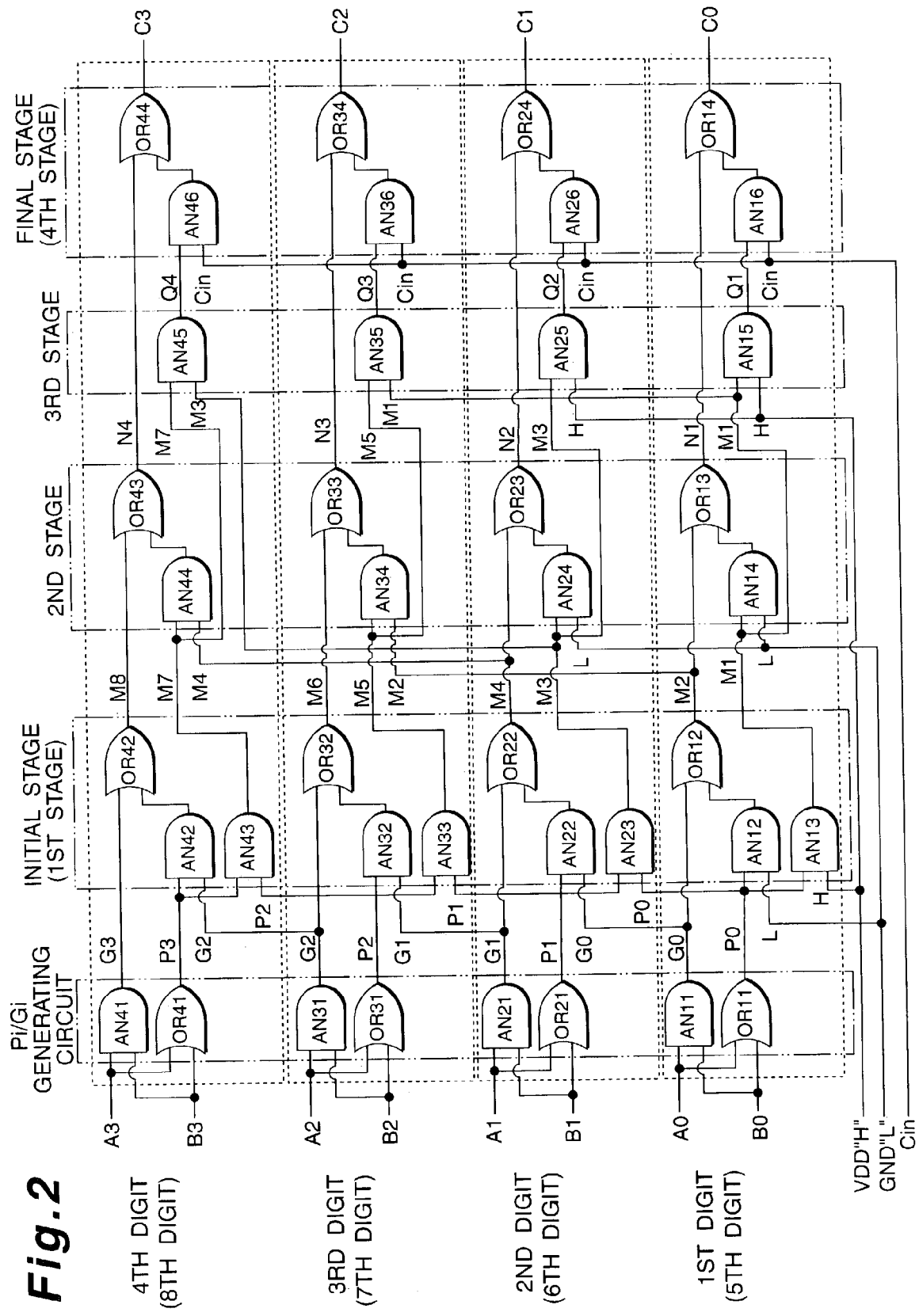
FIG. 2 is a block diagram showing a main portion of a carry foreknowledge adder according to the embodiment 2 of the invention.

FIG. 2 is a block diagram showing a main portion of a carry foreknowledge adder according to the embodiment 2 of the invention.

The embodiment 2 of FIG. 2 differs from the embodiment 1 shown in FIG. 1 with respect to the following points and since other constructions are similar to those in the embodiment 1, their overlapped explanations are omitted here.

(A) AND circuits AN12 and AN13 and an OR element OR12 similar to those at the first stage of the second or more digit are added to the first stage of the first digit.

(B) An AND circuit AN14 and an OR element OR13 similar to those at the second stage of the third or more digit are added to the second stage of the first digit.

(C) An AND circuit AN24 and an OR element OR23 similar to those at the second stage of the third or more digit are added to the second stage of the second digit.

(D) An AND circuit AN15 similar to that at the third stage of the third or more digit is added to the third stage of the first digit.

(E) An AND circuit AN25 similar to that at the third stage of the third or more digit is added to the third stage of the second digit.

In the embodiment, by adding the elements shown in the above items (A) to (E), the logic arithmetic operating elements used in the arithmetic operating circuit of the highest digit (fourth digit in FIG. 1) in the carry foreknowledge circuit in the embodiment 1 are provided for the arithmetic operating circuits of all digits.

It is assumed that a connection of the circuits in each digit is similarly made with respect to the circuits of all digits. It is assumed that a connection of each digit is similarly made while excluding the circuit for arithmetically operating the AND of the front stage circuit (third stage) of the final stage.

A high-level voltage (H) on the power source side is inputted to one input of the AND circuit in the case where the input signal is passed and outputted without executing the logic arithmetical operation among the circuits (logic arithmetic operation elements) added in the above items (A) to (E), thereby assuring a signal passing path.

A low-level voltage (L) on the ground side is inputted to one input of the AND circuit in the case where the logic arithmetical operation is not executed and the input signal is not outputted among the circuits (logic arithmetic operation elements) added in the above items (A) to (E), thereby preventing an influence from being exercised on the logic circuits which are used.

As for the reference characters each showing the signal between the stages, although M, N, and Q have been used in the embodiment 2 in order to distinguish them from D, E, and F in the embodiment 1, the reference characters corresponding to the same positions among the signals which are transmitted between the stages denote similar signals in a manner such that D8 and M8 denote the similar signals and E4 and N4 denote the similar signals. The reference characters allocated at positions before and after the circuit through which the signal is allowed to pass also denote the similar signals. The reference characters on the output side of the circuit which does not output the input signal are used for convenience of explanation and the signals shown by these reference characters are not actually outputted as signals. By inputting the voltage (H) or (L) to one input of each of the circuits added in the above items (A) to (E) as mentioned above, the operation similar to that in the embodiment 1 can be executed.

Since the embodiment has been constructed as mentioned above, the high speed operation can be executed in a manner similar to the case in the embodiment 1. Further, since the circuit for each digit is similarly constructed, even if the number of arithmetic operation bits or the number of arithmetic operation digits is changed, the circuit can be easily changed.

Embodiment 3

In the foregoing embodiments 1 and 2, attention is paid to the realization of the high operating speed which is obtained by inputting the carry input Cin from the lower digit group (addition digit group) to the final stage of the carry foreknowledge adder. By applying the constructions of the foregoing embodiments 1 and 2 and inputting the carry input Cin to the stage other than the final stage of the carry foreknowledge adder, the circuit scale and an amount of wirings between the circuits for every digit can be reduced. Therefore, an embodiment in which the circuit scale and an amount of wirings between the circuits for every digit are reduced by applying the constructions of the foregoing embodiments 1 and 2 will be described hereinbelow.

Figure 3:
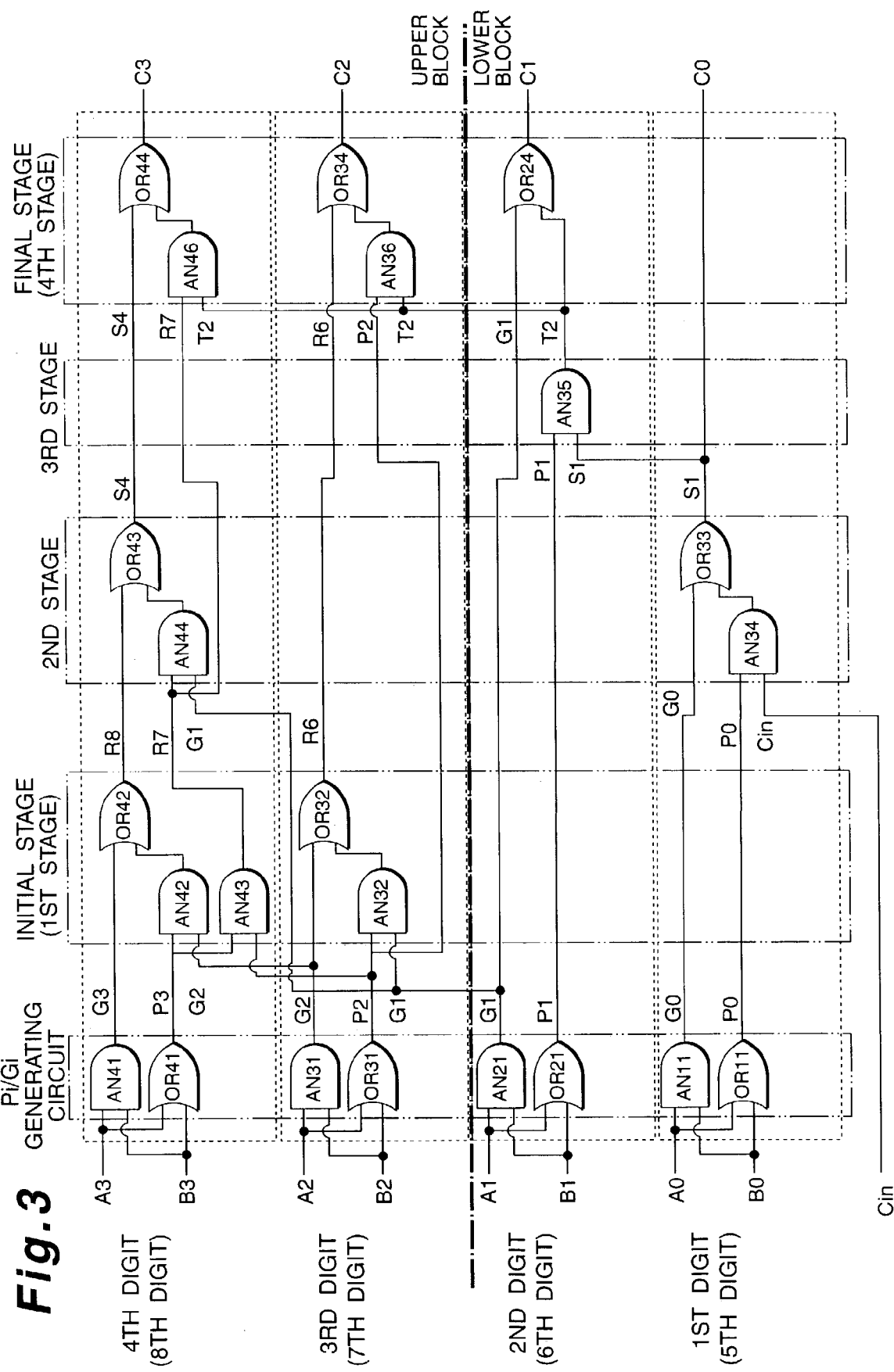
FIG. 3 is a block diagram showing a main portion of a carry foreknowledge adder according to the embodiment 3 of the invention.

FIG. 3 is a block diagram showing a main portion of a carry foreknowledge adder in the embodiment 3 of the invention.

The embodiment 3 of FIG. 3 differs from the embodiment 1 shown in FIG. 1 with respect to the following points and since other constructions are similar to those in the embodiment 1, their overlapped explanations are omitted here.

(F) The circuit of the first digit and the circuit of the second digit are set to a lower block and the circuits of the third and fourth digits are set to an upper block, thereby separating the circuits into the upper and lower blocks.

(G) In the circuit of the first digit, the AND circuit AN16 and the OR circuit OR14 at the final stage (fourth stage) are deleted and the AND circuit AN14 and the OR circuit OR13 are provided in the second stage. The carry input Cin is inputted to one input of the AND circuit AN14, the propagation signal P0 of the first digit is inputted to the other input, and an output of the AND circuit AN14 is inputted to one input of the OR circuit OR13. The generation signal G0 of the first digit is inputted to the other input of the OR circuit OR13. G0+P0 Cin (=C0) is outputted as an output S1 from the OR circuit OR13. The output S1 is outputted as a carry output C0 of the first digit and also inputted to the third stage of the circuit of the second digit. Since the carry output of the first digit is inputted to the circuit of the second digit, the construction of the ripple carry adder is partially used as an application form.

(H) In the circuit of the second digit, the AND circuit AN26 at the final stage (fourth stage) is deleted and the AND circuit AN25 is provided in the third stage. An output T2 of the AND circuit AN25 is inputted to one input of the AND circuit AN36 at the final stage of the third digit and to one input of the AND circuit AN46 at the final stage of the fourth digit. Therefore, the carry input Cin is prevented from being inputted to the AND circuit AN36 at the final stage of the third digit and the AND circuit AN46 at the final stage of the fourth digit.

(I) In the circuit of the second digit, the AND circuits AN22 and AN23 and the OR circuit OR22 at the initial stage (first stage) are deleted. The generation signal G1 is directly inputted to one input of the OR circuit OR24 at the final stage (fourth stage). The propagation signal P1 is directly inputted to one input of the AND circuit AN25 at the third stage.

(J) In the circuit of the third digit, the AND circuit AN35 at the third stage, the AND circuit AN34 and the OR circuit OR33 at the second stage, and the AND circuit AN33 at the initial stage are deleted. The propagation signal P2 of the third digit is inputted to one input of the AND circuit AN36 at the final stage (fourth stage). The output T2 of the AND circuit AN25 is inputted to the other input of the AND circuit AN36 as mentioned above. An output of the AND circuit AN36 is inputted to one input of the OR circuit OR34. An output R6 (=G2+P2·G1) of the OR circuit OR32 at the initial stage (first stage) is directly inputted to the other input of the OR circuit OR34 at the final stage (fourth stage).

(K) In the circuit of the fourth digit, the AND circuit AN45 at the third stage is deleted. An output R7 of the AND circuit AN43 at the initial stage is inputted to one input of the AND circuit AN46 at the final stage (fourth stage). The output T2 of the AND circuit AN25 is inputted to the other input of the AND circuit AN46 as mentioned above. An output of the AND circuit AN46 is inputted to one input of the OR circuit OR44. The generation signal G1 of the second digit is inputted to one input of the AND circuit AN44 at the second stage. The output R7 of the AND circuit AN43 at the initial stage is inputted to the other input of the AND circuit AN44.

By modifying the equations up to the fourth digit (C3) of the equations (6) in the circuit of the embodiment, the following circuit constructions are obtained.

$$C0 = G0 + P0 \cdot Cin$$

$$C1 = G1 + P1(G0 + P0 \cdot Cin)$$

$$C2 = (G2 + P2 \cdot G1) + P2 \cdot P1(G0 + P0 \cdot Cin)$$

$$C3 = (G3 + P3 \cdot G2) + P3 \cdot P2 \cdot G1 + P3 \cdot P2 \cdot P1(G0 + P0 \cdot Cin) \quad (9)$$

In the equations (9), G0+P0 Cin in the equation of the carry output C0 of the first digit is formed by the AND circuit AN14 and the OR circuit OR13 at the second stage of the first digit.

P1(G0+P0·Cin) in the equation of the carry output C1 of the second digit is formed by the AND circuit AN25 at the third stage of the second digit.

G1+P1·G0+P1·P0·Cin(=C1) in the equation of the carry output C1 of the second digit is formed by the OR circuit OR24 at the final stage of the second digit.

G2+P2·G1 in the equation of the carry output C2 of the third digit is formed by the AND circuit AN32 and the OR circuit OR32 at the initial stage of the third digit.

P2·P1(G0+P0·Cin) in the equation of the carry output C2 of the third digit is formed by the AND circuit AN36 at the final stage of the third digit.

G3+P3·G2 in the equation of the carry output C3 of the fourth digit is formed by the AND circuit AN42 and the OR circuit OR42 at the initial stage of the fourth digit.

P3·P2·G1 in the equation of the carry output C3 of the fourth digit is formed by the AND circuit AN44 at the second stage of the fourth digit.

P3·P2·P1(G0+P0·Cin) in the equation of the carry output C3 of the fourth digit is formed by the AND circuit AN46 at the final stage of the fourth digit. Further, with respect to integration of the wirings, for example, by modifying G0+P0·Cin in the equations (9) so as to be integrated into C0, a circuit construction can be considered. It is considered that the construction such that the carry outputs in a kind of ripple carry adder are sequentially transmitted is applied.

$$C0 = G0 + P0 \cdot Cin$$

$$C1 = G0 + P1 \cdot C0$$

$$C2 = (G2 + P2 \cdot G1) + P2 \cdot P1 \cdot C0$$

$$C3 = (G3 + P3 \cdot G2) + P3 \cdot P2 \cdot G1 + P3 \cdot P2 \cdot P1 \cdot C0 \quad (10)$$

As mentioned above, according to the embodiment, the circuits for each digit of the carry foreknowledge adder are divided into two blocks: the upper block comprising the upper digits of at least two or more digits from the maximum digits; and the lower block of the residual lower digits. In the lower block, the construction of the ripple carry adder for outputting the carry output of the lower digit to the upper digit is applied and used. The carry input Cin from the addition digit group of the lower digit is inputted to any stage before the final stage and the carry output of at least one digit is formed at the front stage of the final stage.

Although the construction of the carry foreknowledge circuit in the embodiment 1 or 2 mentioned above is used in the upper block, the output using the carry output formed in the lower block is inputted to the final stage circuit instead of the carry input Cin from the addition digit group of the lower digit.

As for the reference characters each showing the signal between the stages, although R, S, and T have been used in the embodiment 3 in order to distinguish them from D, E, and F in the embodiment 1 and M, N, and Q in the embodiment 2, for example, D8, M8, and R8 denote similar signals and E4, N4, and S4 denote similar signals. Other reference characters showing the signals between the stages in the embodiment 3 are different from those in the embodiments 1 and 2.

The carry output C0 (=Si) of the first digit in the embodiment is G0+P0·Cin.

The carry output C1 of the second digit is $$G1 + T2 = G1 + P1 \cdot S1$$
$$= G1 + P1(G0 + P0 \cdot Cin)$$
$$= G1 + P1 \cdot G0 + P1 \cdot P0 \cdot Cin$$

The carry output C2 of the third digit is $$R6 + P2 \cdot T2 = G2 + P2 \cdot G1 + P2(P1(G0 + P0 \cdot Cin))$$
$$= G2 + P2 \cdot G1 + P2 \cdot P1 \cdot G0 + P2 \cdot P1 \cdot P0 \cdot Cin$$

The carry output C3 of the fourth digit is $$S4 + R7 \cdot T2 = R8 + P3 \cdot P2 \cdot G1 + P3 \cdot P2(P1(G0 + P0 \cdot Cin))$$
$$= G3 + P3 \cdot G2 + P3 \cdot P2 \cdot G1 +$$
$$P3 \cdot P2 \cdot P1 \cdot G0 + P3 \cdot P2 \cdot P1 \cdot P0 \cdot Cin$$

As mentioned above, also in the embodiment, since the carry outputs C0 to c3 in the first to fourth digits are the same as those in the equations (6) and (7), similar results can be outputted as a logic circuit.

Subsequently, when the carry foreknowledge circuit in the embodiment 1 shown in FIG. 1 and the carry foreknowledge circuit in the embodiment 3 shown in FIG. 3 are compared, although at least three wirings G0, P0, and Cin between the circuit of the first digit and the circuit of the second digit in the carry foreknowledge circuit in the embodiment 1 are necessary, one wiring S1 between the circuit of the first digit and the circuit of the second digit is used in the embodiment 3.

In the wirings between the circuit of the second digit and the circuit of the third digit for dividing the upper block and the lower block, although seven wirings G1, P1, G0, D3, D4, P0, and Cin are necessary in the case of the carry foreknowledge circuit in the embodiment 1, two wirings G1 and T2 are used in the embodiment 3.

In the wirings between the circuit of the third digit and the circuit of the fourth digit, although five wirings G2, P2, D4, D3, and Cin are necessary in the case of the carry foreknowledge—foreknowledge—foreknowledge circuit in the embodiment 1, four wirings G1, G2, P2, and T2 are used in the embodiment 3.

Therefore, the number of wirings between the circuits of all of the digits can be reduced. However, particularly, the number of wirings between the circuit of the second digit and the circuit of the third digit for dividing the upper block and the lower block can be remarkably reduced from 7 to 2.

In the case of calculating the number of elements as the number of 2-input elements, 23 elements are necessary in the carry foreknowledge circuit in the embodiment 1 shown in FIG. 1. However, according to the embodiment 3, since the carry foreknowledge—foreknowledge—foreknowledge circuit can be constructed by 15 elements, the circuit scale can be reduced.

As a critical path in the carry foreknowledge circuit, since the number of elements which need to be arithmetically operated in order to output the carry output C3 is equal to 4 in a manner similar to the carry foreknowledge circuit in the embodiment 1 shown in FIG. 1, the arithmetic operating time can be reduced and the operating speed can be raised in a manner similar to the embodiment 1.

As mentioned above, according to the embodiment 3, since the carry input Cin from the addition digit group of the lower digit is not inputted to the final stage unlike the embodiments 1 and 2, although the operating speed is lower than those in the embodiments 1 and 2, the operating speed can be set to be higher than that of the conventional carry foreknowledge circuit shown in FIG. 7 and the circuit scale can be further reduced.

Particularly, in the case of forming the adder by using a number of 4-bit adders according to the embodiment 3, since it can be constructed by 15 elements as compared with 27 elements in the conventional adder shown in FIG. 7, a further typical effect of reducing the circuit scale can be obtained. Also when the adder of the embodiment 3 is compared with the carry foreknowledge adder in the embodiment 1, since the number of wirings between the digits can be reduced, a further typical effect of reducing the circuit scale can be obtained.

Embodiment 4

In the foregoing embodiment 2, the circuits which are different every digit in the embodiment 1 are constructed in common and even when the number of arithmetic operation bits or the number of arithmetic operation digits is changed, it can be easily changed. However, also in the foregoing embodiment 3, it is also possible to construct in a manner such that the circuits which are different every digit are constructed in common and even when the number of arithmetic operation bits or the number of arithmetic operation digits is changed, it can be easily changed. Therefore, an embodiment in which by forming the constructions for every digit in the foregoing embodiment 3 in common, even when the number of arithmetic operation bits or the number of arithmetic operation digits is changed, it can be easily changed will be described hereinbelow.

Figure 4:
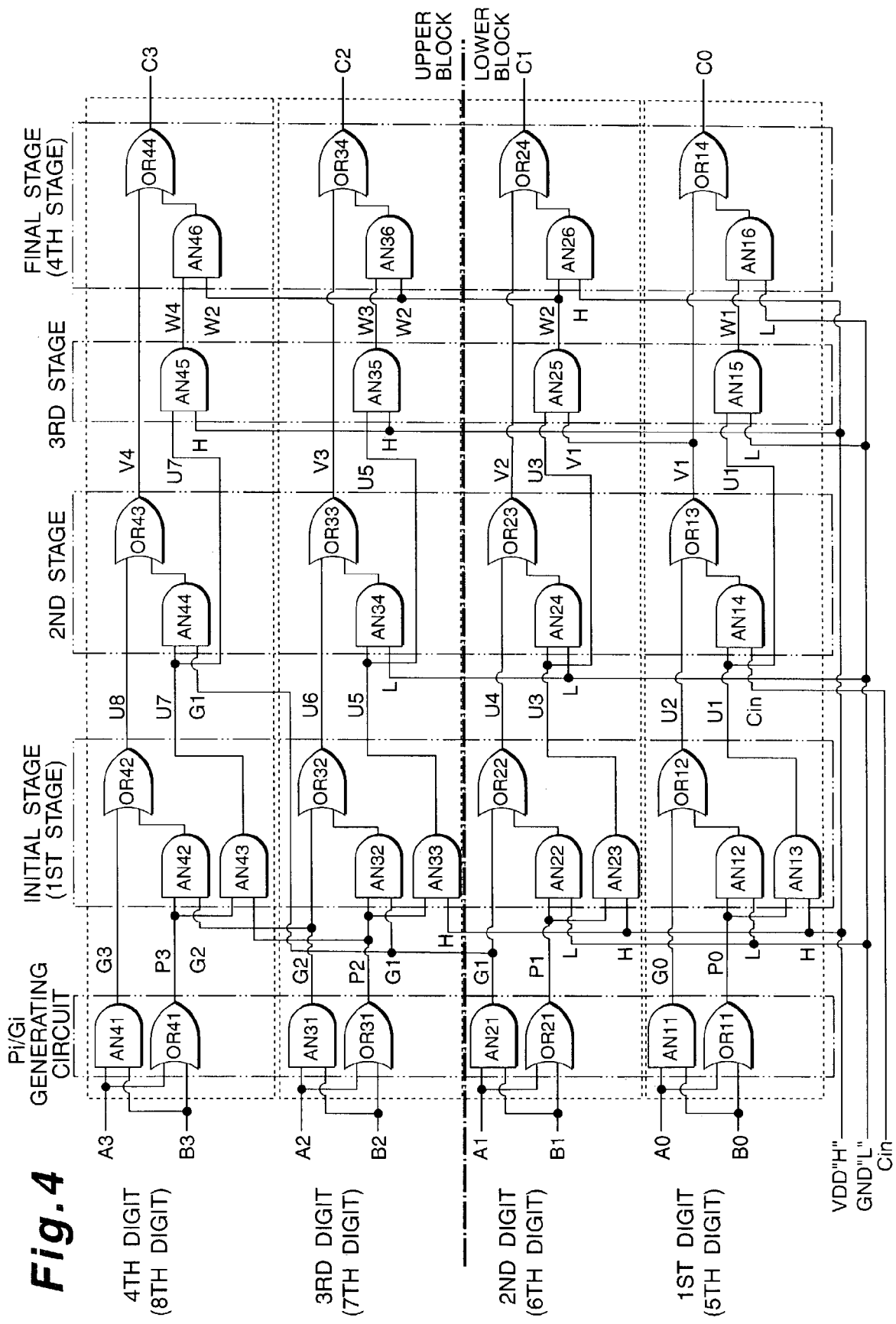
FIG. 4 is a block diagram showing a main portion of a carry foreknowledge adder according to the embodiment 4 of the invention.
Figure 5:
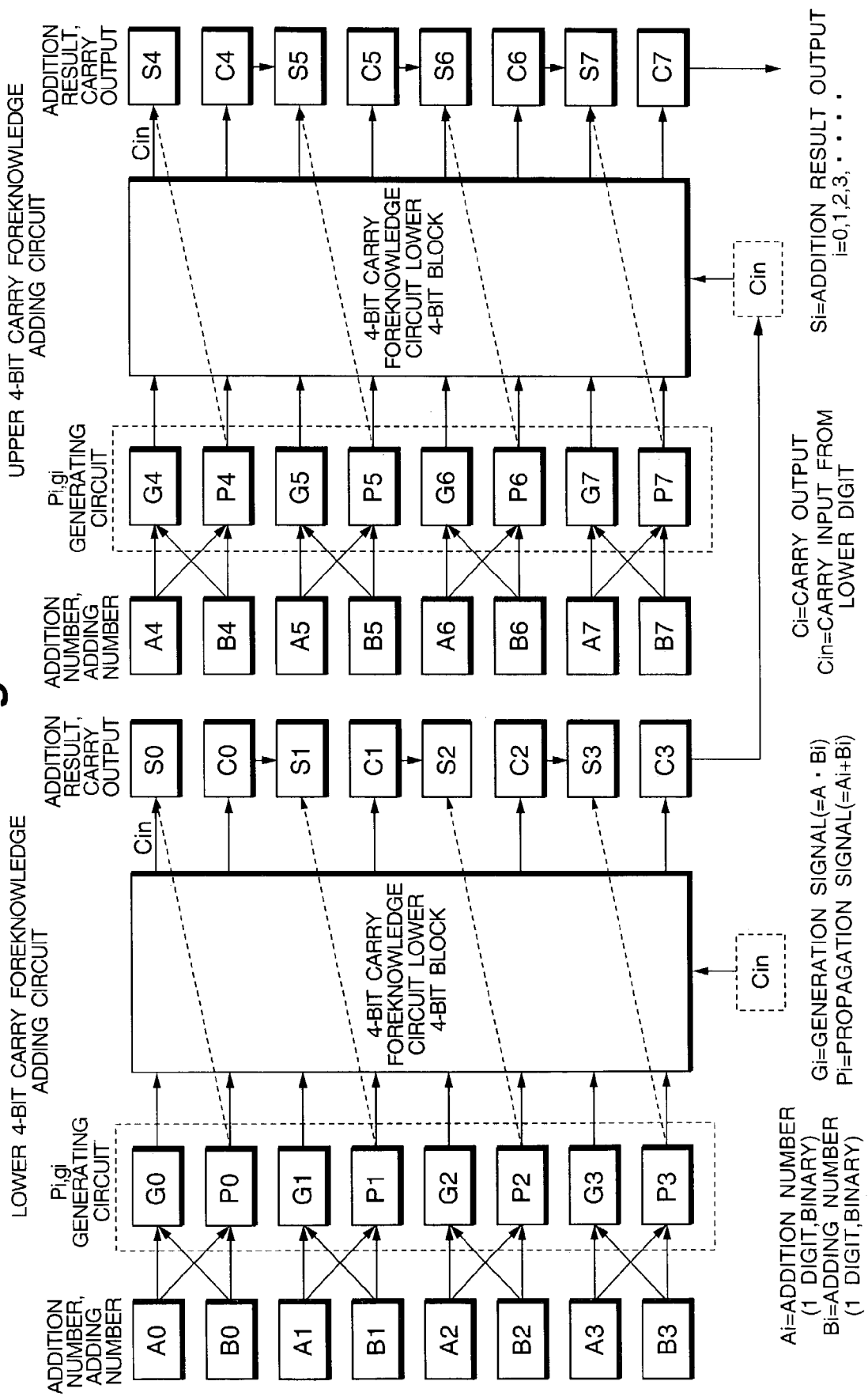
FIG. 5 is a block diagram showing a constructional example of an 8-bit adder using two carry foreknowledge adding circuit of 4 bits.
Figure 6:
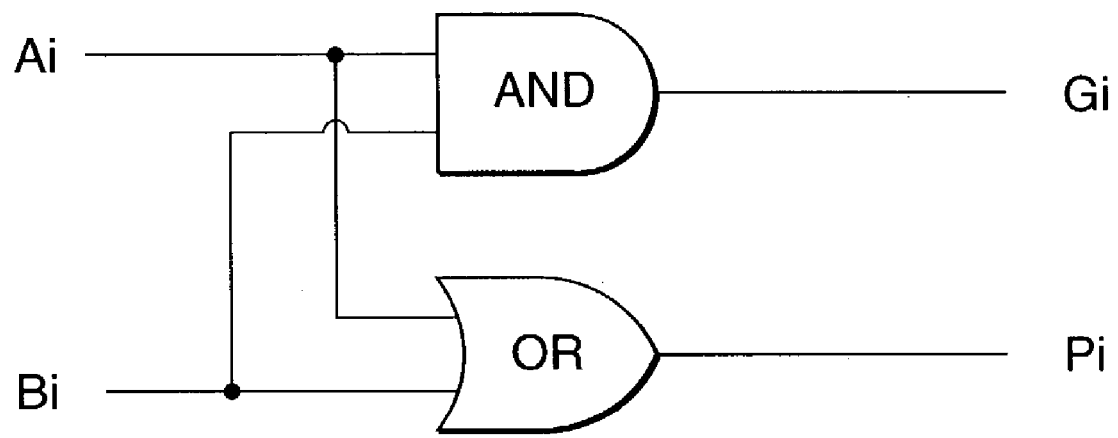
FIG. 6 is a block diagram showing a construction of a Pi/Gi generating circuit of each digit in the carry foreknowledge adding circuits of 4 bits.

FIG. 4 is a block diagram showing a main portion of a carry foreknowledge adder according to an embodiment 4 of the invention.

The embodiment 4 of FIG. 4 differs from the embodiment shown in FIG. 3 with respect to the following points and since other constructions are similar to those in the embodiment 1, their overlapped explanations are omitted here.

(L) AND circuits AN12 and AN13 and the OR element OR12 similar to those at the first stage of the fourth digit are added to the first stage of the first digit. An AND circuit AN15 similar to that at the third stage of the second digit is added to the third stage of the first digit. The AND circuit AN16 and the OR element OR14 similar to those at the final stage (fourth stage) of the third or more digit are added to the final stage (fourth stage) of the first digit.

(M) The AND circuits AN22 and AN23 and the OR element OR22 similar to those at the first stage of the fourth digit are added to the first stage of the second digit. The AND circuit AN24 and the OR element OR23 similar to those at the second stage of the fourth digit are added to the second stage of the second digit. The AND circuit AN26 similar to that at the final stage (fourth stage) of the third or more digit is added to the final stage (fourth stage) of the first digit.

(N) The AND circuit AN34 and the OR element OR33 similar to those at the second stage of the fourth digit are added to the second stage of the third digit. The AND circuit AN35 similar to that at the third stage of the second digit is added to the third stage of the third digit.

(O) The AND circuit AN45 similar to that at the third stage of the second digit is added to the third stage of the fourth digit.

In the embodiment 4, by adding the circuits shown in the above items (L) to (O), the logic arithmetic operation elements used in the arithmetic operating circuit of the highest digit (fourth digit in FIG. 1) and the second digit in the carry foreknowledge circuit in the embodiment 3 are provided for the arithmetic operating circuits of all of the digits. A connection of the circuit in each digit is similarly made in the circuits of all of the digits.

The high-level voltage (H) on the power source side is inputted to one input of the AND circuit in the case where the input signal is passed and outputted without executing the logic arithmetical operation among the circuits (logic arithmetic operation elements) added in the above items (L) to (O), thereby assuring a signal passing path.

The low-level voltage (L) on the ground side is inputted to one input of the AND circuit in the case where the logic arithmetical operation is not executed and the input signal is not outputted among the circuits (logic arithmetic operation elements) added in the above items (L) to (O), thereby preventing an influence from being exercised on the logic circuits which are used.

As for the reference characters each showing the signal between the stages, although U, V, and W have been used in the embodiment 4 in order to distinguish them from R, S, and T in the embodiment 3, for example, the reference characters corresponding to the same positions among the signals which are transmitted between the stages denote similar signals in a manner such that R8 and U8 denote the similar signals and S4 and V4 denote the similar signals. The reference characters allocated at positions before and after the circuit through which the signal is allowed to pass also denote the similar signals. The reference characters on the output side of the circuit which does not output the input signal are used for convenience of explanation and the signals shown by these reference characters are not actually outputted as signals. By inputting the voltage (H) or (L) to one input of each of the circuits added in the above items (L) to (O) as mentioned above, the operation similar to that in the embodiment 3 can be executed.

The wirings of the high-level voltage (H) and the wirings of the low-level voltage (L) of the upper block are integrated in each of the upper block and the lower block. The wirings of the high-level voltage (H) and the wirings of the low-level voltage (L) on the upper block side are connected by using the integrated wirings, thereby enabling an amount of wirings between the blocks to be reduced.

Arrangement of the elements in FIG. 4 is similar to that of the elements in FIG. 2 if the wirings between the digits and the wirings between the stages are ignored. Therefore, if the user wants to realize the high operating speed, the wirings between the digits and the wirings between the stages can be made in accordance with FIG. 2. If the user wants to reduce the circuit scale, the wirings between the digits and the wirings between the stages can be made in accordance with FIG. 4. Thus, a degree of freedom of design can be increased in the embodiments 2 and 4.

Since the embodiment 4 is constructed as mentioned above, the operating speed can be set to be higher than that in the conventional carry foreknowledge adding circuit in a manner similar to the embodiment 3.

Further, the circuit scale can be reduced and the circuit construction for each digit is similar. Therefore, even if the number of arithmetic operation bits or the number of arithmetic operation digits is changed, it can be easily changed.

According to the invention as mentioned above, by inputting the carry input Cin from the lower digit group (addition digit group) to the final stage of the carry foreknowledge adder, the amount of arithmetic operations which are executed after the input of the carry input Cin can be reduced. The arithmetic operating time can be further decreased and the high operating speed can be realized.

In the case of executing the addition by using the two or more 4-bit adders in the invention, in each adder of every 4 bits, since the arithmetic operations up to the timing of the one-preceding stage of the final stage can be simultaneously executed in parallel in the lower digit group and the upper digit group. Therefore, the process time as a whole adding process can be further decreased.

In the adder of the invention, in the case of calculating the number of elements as 2-input elements, the number of elements can be reduced to a value smaller than that in the conventional carry foreknowledge circuit and the circuit scale can be decreased.

According to the invention, since the critical path in the carry foreknowledge circuit can be set to a length shorter than that of the conventional carry foreknowledge circuit, the arithmetic operating time can be reduced and the operating speed can be raised.

In the invention, since the circuit for each digit can be similarly constructed, while the high operating speed is realized, even if the number of arithmetic operation bits or the number of arithmetic operation digits is changed, the circuit can be easily changed.

In the invention, while the operating speed is set to be higher than that of the conventional carry foreknowledge adding circuit, the circuit scale can be reduced.

After the wirings of the high-level voltage (H) and the wirings of the low-level voltage (L) of the upper block were integrated every block, by connecting the wirings between the blocks, the amount of wirings between the blocks can be decreased.

In the invention, since it is sufficient to merely change the wirings between the digits and the wirings between the stages in the case where the user desires to realize the high operating speed and the case where the user desires to reduce the circuit scale, the degree of freedom of the design can be increased.

The present invention is not limited to the foregoing embodiments but many modifications and variations are possible within the spirit and scope of the appended claims of the invention.

What is claimed is:

1. A carry foreknowledge adder comprising:
   an adding circuit which adds binary numbers A and B of n bits; and
   a plurality of carry lookahead circuit blocks (j (j=0, 1, ..., k−1)) that respectively corresponding to divisional portions $A_{k-1}, A_{k-2}, \ldots, A_0$ and $B_{k-1}, B_{k-2}, \ldots, B_0$ obtained by dividing said A and said B into integer k (k≧2) portions through setting m bits (2≦m<n) into a unit length, said carry lookahead circuit block preliminarily arithmetically determining each carry $C_i$ (i=0, 1, ..., m−1) corresponding to each of bit $A_i$ and bit $B_i$ and outputting them to said adding circuit, wherein
   each carry lookahead circuit block (j) has a plurality of arithmetic operating portions (j, i) in correspondence to each bit, that respectively receive a carry $C_{m-1}$, as a block carry $C_{in}$, corresponding to the most significant bit in a lower said carry lookahead circuit block (j−1) from said lower carry lookahead circuit block (j−1) corresponding to lower said divisional portion, each arithmetic operating portion arithmetically determining said carry $C_i$ on the basis of said block carry $C_{in}$, and outputting said carry $C_i$ to said adding circuit, and
   said arithmetic operating portion (j, i) has a logic circuit portion which receives said block carry $C_{in}$ and is arranged on an output terminal side,
   said carry foreknowledge circuit block (j) further receives an H signal indicative of the high level and an L signal indicative of the low level,
   said arithmetic operating portions (j, i) include identical logic circuit portions, and
   said logic circuit portions includes a logic circuit portion which receives said H signal and a logic circuit portion which receives said L signal.

2. The adder according to claim 1, wherein said n is equal to a multiple of 4, said unit length is equal to 4 bits, and said carry foreknowledge circuit block is a carry foreknowledge circuit block of 4 bits.

3. The adder according to claim 2, wherein each of said unit lengths is set to be constant.

4. The adder according to claim 2, wherein each of said unit lengths is set to be inconstant.

5. A carry foreknowledge adder comprising:
   an adding circuit which adds binary numbers A and B of n bits;
   a plurality of carry lookahead circuit blocks (j (j=0, 1, ..., k−1)) that respectively corresponding to divisional portions $A_{k-1}, A_{k-2}, \ldots, A_0$ and $B_{k-1}, B_{k-2}, \ldots, B_0$ obtained by dividing said A and said B into integer k (k≧2)

portions through setting m bits (2≦m<n) into a unit length, said carry lookahead circuit block preliminarily arithmetically determining each carry $C_i$ (i=0, 1, ..., m−1) corresponding to each of bit $A_i$ and bit $B_i$ and outputting them to said adding circuit, wherein each carry lookahead circuit block (j) has a plurality of arithmetic operating portions (j, i) in correspondence to each bit, that respectively receive a carry $C_{m-1}$, as a block carry $C_{in}$, corresponding to the most significant bit in a lower said carry lookahead circuit block (j−1) from said lower carry lookahead circuit block (j−1) corresponding to lower said divisional portion, each arithmetic operating portion arithmetically determining said carry $C_i$ on the basis of said block carry $C_{in}$, and outputting said carry $C_i$ to said adding circuit, said each arithmetic operating portion (j, i) having a logic circuit portion which receives said block carry $C_{in}$ and is arranged on an output terminal side;

a plurality of generating circuits (j (j=0, 1, ..., k−1)) respectively corresponding to each of said divisional portions $A_{k-1}, A_{k-2}, ..., A_0$ and $B_{k-1}, B_{k-2}, ..., B_0$, each said generating circuit generating a plurality of logic OR $P_i$ (i=0, 1, ..., m−1) values and logic AND $G_i$ values corresponding to said bit $A_i$ and said bit $B_i$, and wherein said each arithmetic operating portion (j, i) receives said $P_i$ and said $G_i$ and executes an arithmetic determination of said carry $C_i$ by using said $P_i$, said $G_i$ and said block carry $C_{in}$ and on the basis of the following logic arithmetic operational equation:

$$C_i = G_i + P_i \cdot G_{i-1} + P_i \cdot P_{i-1} \cdot G_{i-2} + \ldots + P_i \cdot P_{i-1} \ldots P_3 \cdot P_2 \cdot G_0 + P_i \cdot P_{i-1} \ldots P_2 \cdot P_0 \cdot C_{in},$$

wherein said carry foreknowledge circuit block (j) further receives an H signal indicative of the high level and an L signal indicative of the low level, wherein said arithmetic operating portions (j, i) include identical logic circuit portions, and said logic circuit portions includes a logic circuit portion which receives said H signal and a logic circuit portion which receives said L signal.

6. The adder according to claim 5, wherein each of said unit lengths is set to be constant.

7. The adder according to claim 5, wherein each of said unit lengths is set to be inconstant.

8. The adder according to claim 5, wherein said n is equal to a multiple of 4, said unit length is equal to 4 bits, and said carry foreknowledge circuit block is a carry foreknowledge circuit block of 4 bits.

9. A carry foreknowledge adder comprising:

an adding circuit which adds binary numbers A and B of n bits; and a plurality of carry foreknowledge circuit blocks (j (j=0, 1, ..., k−1)) that respectively corresponding to divisional portions $A_{k-1}, A_{k-2}, ..., A_0$ and $B_{k-1}, B_{k-2}, ..., B_0$ obtained by dividing said A and said B into integer k (k≧2) portions through setting m bits (2≦m<n) into a unit length, said carry foreknowledge circuit block preliminarily arithmetically determining each carry $C_i$ (i=0, 1, ..., m−1) corresponding to each of bit $A_i$ and bit $B_i$ and outputting them to said adding circuit, wherein said carry foreknowledge circuit block (j) has a plurality of arithmetic operating portions (j, i) in correspondence to each bit, that respectively arithmetically determine said carry $C_i$ and output said carry $C_i$ to said adding circuit;

each upper said arithmetic operating portion (j, i) respectively corresponding to each of the bits of at least two digits from the most significant bit, in order to execute said arithmetical operation, has a logic circuit portion which receives a lower output signal outputted from a logic circuit portion arranged on an output terminal side of a lower said arithmetic operating portion (j, i) corresponding to the lower bit following under said at least two digits, and which is arranged on the output terminal side, and executes the arithmetic operation of said carry $C_i$ by using said received lower output signal, said carry foreknowledge circuit block (j) further receives an H signal indicative of the high level and an L signal indicative of the low level, said arithmetic operating portions (j, i) include identical logic circuit portions, and said logic circuit portions include a logic circuit portion which receives said H signal and a logic circuit portion which receives said L signal.

10. The adder according to claim 9, wherein each of said unit lengths is set to be constant.

11. The adder according to claim 9, wherein each of said unit lengths is set to be inconstant.

* * * * *